Patented Oct. 6, 1936

2,056,453

UNITED STATES PATENT OFFICE 2,056,453

RESINOUS MATERIALS AND PROCESSES FOR HARDENING AND MOLDING THEM

Arthur M. Howald, Pittsburgh, Pa., assignor, by mesne assignments, to Plaskon Company, Incorporated, a corporation of Delaware No Drawing. Application May 26, 1928, Serial No. 280,949

6 Claims. (Cl. 106—22)

This invention relates to certain improvements in manufacture of hard, glassy, impervious, molded articles from formaldehyde and urea; and it includes a method wherein urea and formaldehyde are caused to react in aqueous solution in the presence of base and the reaction product is thereafter admixed with a substance developing acidity on heating; the mixture being then dried and ground to produce a molding powder. This molding powder, when subjected to heat and pressure, develops acidity sufficient to overcome residual alkalinity, thereby becoming converted into the said hard, glassy and impervious material. This molding powder forms part of the present invention. Thiourea or guanidin may be used in lieu of urea.

It is known that transparent glass-like resinous materials may be prepared by methods including a preliminary condensation of ureas and similar substances with aldehydes. Urea and formaldehyde have been condensed without catalysts, with basic catalysts, with acid catalysts and with basic and acid catalysts added successively; condensation producing thick and viscous liquids which can be converted into glassy materials by a further treatment.

Such urea-formaldehyde combinations can be kept liquid by keeping them alkaline. Upon making them neutral or slightly acid by the removal through evaporation or otherwise of the basic substance or by the addition of small quantities of acids or mildly acid salts, gelation takes place and sheets and cast articles have been prepared therefrom by pouring. Upon neutralization or slight acidification and the evaporation of water, the condensate becomes clear and glass-like and upon mild heating it becomes strong, insoluble and infusible. The infusible glass-like product is produced only when the final hydrogen ion concentration is made to correspond to a nearly neutral or slightly acid condition.

There are many difficulties in the way of the commercial production of shaped articles of urea-formaldehyde condensation products made by processes hitherto employed or known. These processes are not reliable and do not give reproducible results. When evaporation of a volatile base and the solvent is depended upon to attain neutralization and gelation, the process is slow and the article shrinks after casting. When the solution is acidified, gelation takes place rapidly with the expulsion of solvent and cracking and opacity are liable to result. Heat-pressure molding as heretofore practiced presents difficulties because of the necessity for molding during the transitional stage, i. e., after acidification but before complete hardening, and because of the necessity for removing solvent.

It is an object of this invention to provide means whereby articles of urea-formaldehyde resin and the like may be cleanly and expeditiously molded; reacting upon urea with formaldehyde in such a manner as to produce, as an intermediate product, a fine powder susceptible of conversion into the glassy final products by hot molding.

Another object is the production of final articles which are not liable to shrinkage, warping or cracking.

Still another object is the provision of means for preparing a urea-formaldehyde condensate as a thermoplastic molding powder in a dry or powdered form in which it may be stored and shipped and subsequently molded and hardened.

To these ends I have provided a process whereby condensates of ureas and aldehydes prepared with alkaline catalysts may be placed in dies in a dry condition and molded under heat and pressure, acidification being accomplished during the molding operation to fix in the product the desirable qualities of hardness, transparency, insolubility and infusibility.

In carrying out my invention I prepare an alkaline urea-aldehyde solution and evaporate it to dryness. The residue thus obtained is fusible and in the dry condition is thermoplastic, being readily molded under heat and pressure in closed dies. If the product when molded retains its alkalinity, it will remain fusible and be soluble and brittle. By the process of my invention, however, the dry alkaline substance is made neutral or mildly acid while still in the die, after shaping under heat and pressure has taken place. Acid is developed by heat. I accomplish this step by mixing the condensation product, before or after drying, with an agent which is capable of developing acid by internal rearrangement on heating; that is, an agent which will add new acid to the system at the time of molding. I have found that β-brom hydro cinnamic acid (which liberates the strong acid HBr on heating to molding temperatures) or iso-dibrom succinic anhydride are suitable agents. Very small quantities of these or equivalent substances may be used.

These compounds decompose rather suddenly at molding temperatures yielding new substances which accelerate the hardening of the molding composition, the new substances developed in situ being acid bodies. β-brom-hydro cinnamic acid decomposes at about 100° C. When heated it decomposes into halogen hydride and cinnamic acid. (See page 255, Vol. II Richter's Organic Chemistry, 1908 edition). Iso-dibrom succinic anhydride decomposes at 100° C. breaking down into HBr and brom-maleic anhydride (see page 451, Vol. I, ibid). These compounds are substantially inert at temperatures below those used in hot pressing.

I prefer to mix the agent in the urea-formaldehyde solution, evaporate the solution to dryness at a low temperature, preferably drying under vacuum, and pulverize the residue, which is still in an alkaline and, hence, a fusible condition. When it is fused in a hot mold and shaped under pressure, the acidifying agent becomes active and imparts to the product the desirable characteristics of hardness, insolubility and infusibility.

In a typical embodiment of my invention, 1 mol. of urea (carbamide) is mixed with aqueous formaldehyde (2 mols.), concentrated ammonia solution (about 1/8 mol.) and a small quantity of mineral basic substance such as soda or carbonate of lime. The mixture is boiled until condensation of urea and formaldehyde takes place and the resultant solution is then evaporated to a thick syrupy consistency. During evaporation ammonia is lost but because of the small amount of mineral alkali still present the condensation product does not gel. After cooling, the syrupy liquid is mixed with an agent incapable of completely neutralizing the mineral alkali in the cold but capable of liberating acid on heating sufficient in strength and amount to neutralize the composition or render it slightly acid. The alkaline mixture is then evaporated and dried in vacuo at a low temperature to complete dryness, powdered, and molded and polymerized through acidification developed under heat and pressure.

With either of the treating agents mentioned above, β-brom hydrocinnamic acid or iso di-brom succinic anhydride, the increase in acidification and consequent polymerization is accomplished by thermal decomposition in the mold. The liberation of an acid by thermal decomposition is a mono-molecular reaction and is not dependent upon the presence of water or other chemical substances. The reaction of β-brom hydrocinnamic acid on heating is to split off or liberate the strong acid HBr and it is not necessary that any other substance capable of combining with the remainder of the β-brom hydrocinnamic acid molecule be present. Because of the fact that hydrobromic acid is a very strong acid, very little of the acidifying agent need be used. Prior to the application of heat in the mold the condensate is very slightly acid neutral or even alkaline, the small amount of weak acid employed being more or less completely neutralized by the mineral alkali or other base. The condensate is, therefore, sufficiently fusible to flow readily in the mold upon the initial application of heat and pressure. The increase in acidification and consequent hardening does not take place until after the application of heat in the mold.

The condensate may also be rendered alkaline when cold, and neutral or acid when heated, by using an organic base to make the solution alkaline and adding a substance which, on subjecting the subsequently dried mixture to heat in the pressure mold, will react with the organic base to form a neutral or mildly acidic substance.

Fillers, coloring matter, diluents or other moldable resins, such as phenol-aldehyde condensation products, may be mixed with the urea-formaldehyde condensation product within the scope of the invention.

I claim:—

1. As a new thermoplastic molding powder, a granular mass of a non-acid condensation product of urea and formaldehyde containing in admixture therewith a small amount of beta-brom-hydro-cinnamic acid.

2. As a new thermoplastic molding powder, useful in hot pressing methods, a granular mass of a non-acid condensation product of urea and formaldehyde containing in admixture therewith a small proportion of material capable of producing Hbr by internal rearrangement when heated to molding temperatures.

3. The molding composition of claim 2, wherein said substance capable of thermally decomposing is of the class consisting of brom-hydro-cinnamic acid and iso-di-brom-succinic anhydrid.

4. In the manufacture of dry, fusible, urea-formaldehyde molding compositions containing substances capable of acidifying the dry composition at molding temperature but inert at lower temperatures, said molding composition being suitable for making pressure-shaped, heat-hardened articles, the process which comprises forming a urea-formaldehyde condensation product in an alkaline aqueous solution, admixing the alkaline condensation product, while still in solution, with a small quantity of an agent incapable of neutralizing the alkalinity thereof but capable of generating HBr only at molding temperature in the dry composition by thermal decomposition, evaporating the water at low temperatures until the mixture is completely dry, to obtain a dry, alkaline stable composition, capable of flowing and then hardenng when hot pressed and comprising a dry, fusible, alkaline urea-formaldehyde condensation product and an inert substance in amount sufficient to acidify the hot pressed composition by means of new acid developed in situ during the hot pressing, said inert substance decomposing only at molding temperature and remaining inert in the dry composition at temperatures below molding temperature.

5. In the manufacture of dry, fusible, urea-formaldehyde molding compositions suitable for making pressure-shaped, hardened articles, the process which comprises reacting urea with formaldehyde in an alkaline aqueous solution, said solution being maintained alkaline by the presence of a volatile basic compound and of a non-volatile basic compound, heating the said solution until an initial alkaline urea-formaldehyde condensation product is formed, evaporating off water and volatile base until a thick sirup containing the non-volatile basic compound to prevent gelling is obtained, cooling the alkaline sirup so obtained, admixing the cooled thick, alkaline sirup with a small amount of an agent incapable of neutralizing the alkalinity thereof but capable of generating HBr in the dry composition by thermal decomposition only at molding temperature, evaporating the water at low temperature under vacuum until the mixture is completely dry, to recover a dry, thermoplastic, alkaline composition capable of being shaped and hardened by hot pressing, said dry composition comprising a dry, fusible, alkaline urea-formaldehyde condensation product and an inert substance in amount sufficient to acidify the hot pressed composition by means of HBr developed in situ, during hot pressing, said substance remaining inert in the dry composition at temperatures below molding temperature, but generating the HBr only at molding temperature.

6. As a new manufacture, an improved molding composition suitable for making pressure-shaped, hardened articles by hot pressing methods, said molding composition being a dry, fusible, alkaline mixture, stable in storage and comprising a dry, alkaline, thermoplastic urea-formaldehyde condensation product and a small amount of an inert substance capable of generating, only at molding temperature, sufficient HBr, in situ, in the hot pressed composition to acidify and harden the same, said substance remaining inert in the dry composition at temperatures below molding temperature.

ARTHUR M. HOWALD.